United States Patent
Kim et al.

(10) Patent No.: US 7,450,640 B2
(45) Date of Patent: Nov. 11, 2008

(54) APPARATUS AND METHOD FOR DETERMINING 4X4 INTRA LUMINANCE PREDICTION MODE

(75) Inventors: So-young Kim, Seoul (KR); Hyeong-seok Ha, Suwon-si (KR); Nam-suk Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1016 days.

(21) Appl. No.: 10/829,301

(22) Filed: Apr. 22, 2004

(65) Prior Publication Data

US 2004/0213348 A1    Oct. 28, 2004

(30) Foreign Application Priority Data

Apr. 22, 2003    (KR) ...................... 10-2003-0025528

(51) Int. Cl.
   *H04N 7/18*    (2006.01)
(52) U.S. Cl. .............................. 375/240.12; 375/240.14
(58) Field of Classification Search ................................
   340/240.11–240.25
   See application file for complete search history.

(56) References Cited

U.S. PATENT DOCUMENTS 6,175,593 B1    1/2001    Kim et al.

6,980,596 B2 *    12/2005    Wang et al. ............ 375/240.16
7,236,524 B2 *    6/2007    Sun et al. ................ 375/240.12
2002/0012396 A1    1/2002    Pau et al.

FOREIGN PATENT DOCUMENTS

| JP | 11-69358 A | 3/1999 |
| JP | 2002-118851 A | 4/2002 |
| KR | 2001-0046144 A | 6/2001 |
| KR | 10-0323235 B1 | 1/2002 |
| KR | 2002-0077630 A | 10/2002 |
| KR | 10-0367619 B1 | 12/2002 |

* cited by examiner

*Primary Examiner*—Andy S Rao
(74) *Attorney, Agent, or Firm*—Sughrue Mion, PLLC

(57) ABSTRACT

A method and apparatus for determining a prediction mode used for video encoding/decoding are provided. The prediction mode determination method includes: (a) grouping a plurality of predetermined prediction modes into a predetermined number of groups; (b) selecting one prediction mode for each of the groups, respectively, performing predictions for a predetermined block in the selected prediction modes, and calculating prediction errors in the selected prediction modes; and (c) performing predictions for the predetermined block in other prediction modes belonging to a group including a prediction mode with a smallest prediction error among the calculated prediction errors, calculating prediction errors in the other prediction modes, and deciding a prediction mode according to the calculated prediction errors. Therefore, it is possible to select an optimal prediction mode through lower calculation times, thereby preventing an encoder from being complicated.

23 Claims, 15 Drawing Sheets

| Intra4x4PredMode [luma4x4BlkIdx] | Name of Intra4x4PredMode[luma4x4BlkIdx] |
|---|---|
| 0 | Intra_4x4_Vertical (prediction mode) |
| 1 | Intra_4x4_Horizontal (prediction mode) |
| 2 | Intra_4x4_DC (prediction mode) |
| 3 | Intra_4x4_Diagonal_Down_Left (prediction mode) |
| 4 | Intra_4x4_Diagonal_Down_Right (prediction mode) |
| 5 | Intra_4x4_Vertical_Right (prediction mode) |
| 6 | Intra_4x4_Horizontal_Down (prediction mode) |
| 7 | Intra_4x4_Vertical_Left (prediction mode) |
| 8 | Intra_4x4_Horizontal_Up (prediction mode) |

FIG. 6A 0 (VERTICAL)

FIG. 6B 1 (HORIZONTAL)

FIG. 6C 2 (DC)

FIG. 6D 3 (DIAGONAL DOWN-LEFT)

FIG. 6E 4 (DIAGONAL DOWN-RIGHT)

FIG. 6F 5 (VERTICAL-RIGHT)

FIG. 6G 6 (HORIZONTRAL-DOWN)

FIG. 6H 7 (VERTICAL-LEFT)

FIG. 6I 8 (HORIZONTAL-UP)

GROUP 1 : 0, 7, 5
GROUP 2 : 1, 8, 6
GROUP 3 : 2, 3, 4

GROUP 1 : 0, 7, 5, 3, 4
GROUP 2 : 1, 8, 6, 4
GROUP 3 : 2, 3, 4, 7, 5, 6

APPARATUS AND METHOD FOR DETERMINING 4X4 INTRA LUMINANCE PREDICTION MODE

BACKGROUND OF THE INVENTION

This application claims the priority of Korean Patent Application No. 2003-25528, filed on Apr. 22, 2003, in the Korean Intellectual Property Office, the disclosure of which is incorporated herein in its entirety by reference.

1. Field of the Invention

The present invention relates to a codec for video data, and more particularly, to an apparatus and method for determining a prediction mode, which are used in a video codec.

2. Description of the Related Art

Broadcast television and home entertainment have been revolutionized by the advent of digital TV and DVD-video. These applications and many more were made possible by the standardization of video compression technology. The next standard in the MPEG series, MPEG4-visual, is enabling a new generation of internet-based video applications whilst the ITU-T H.263 standard for video compression is now widely used in videoconferencing systems.

MPEG4-visual and H.263 are standards that are based on video compression. The groups responsible for these standards, the Motion Picture Experts Group and the Video Coding Experts Group (MPEG and VCEG) are in the final stages of developing a new standard that promises to significantly outperform MPEG4 and H.263, providing better compression of video images together with a range of features supporting high-quality, low bit-rate streaming video.

After finalizing the original H.263 standard, the ITU-T Video Coding Experts Group (VCEG) started work on two further development areas: short-term efforts to add extra features to H.263 (resulting in Version 2 of the standard) and long-term efforts to develop a new standard for low bit-rate visual communications. The long-term effort led to the draft H.26L standard, offering significantly better video compression efficiency than previous ITU-T standards. The ISO Motion Picture Experts Group (MPEG) recognized the potential benefits of H.26L and the Joint Video Team (JVT) was formed, including experts from MPEG and VCEG. The main task of the JVT is to develop the draft H.26 model into a full International Standard. In fact, the outcome will be two identical standards: ISO MPEG4 Part 10 of MPEG4 and ITU-T H.264. The title of the new standard is Advanced Video Coding (AVC); however, it is widely known by its old working title, H.264.

FIG. 1 is a block diagram of an H.264 encoder.

The H.264 encoder includes a prediction unit 110, a transform and quantization unit 120, and an entropy coding unit 130.

The prediction unit 110 performs inter prediction and intra prediction. Inter prediction is prediction for a block of a present picture using a reference picture which is subjected to decoding and deblocking filtering and stored in a buffer. That is, inter prediction is prediction using several pictures of data. To perform such inter prediction, the prediction unit 110 includes a motion estimator 111 and a motion compensator 112. Intra prediction predicts a predetermined block on a decoded picture using pixel data of its adjacent blocks.

The transform and quantization unit 120 transforms and quantizes a prediction sample obtained from the prediction unit 110. The entropy coding unit 130 encodes the quantized result into an H.264 bit stream according to a predetermined format.

FIG. 2 is a block diagram of an H.264 decoder.

The H.264 decoder receives and entropy-decodes a bit stream encoded by the H.264 encoder, performs dequantization and inverse-transformation of the decoded result, and then decodes the result using reference picture information subjected to motion compensation or intra prediction.

FIG. 3 shows a luminance block P to be predicted and its adjacent blocks to be used for prediction of the luminance block P.

If blocks or macroblocks on a picture have been encoded in an intra mode, a block P (310) to be predicted can be predicted using its adjacent decoded blocks A through L. Prediction is performed for chrominance blocks Cb and Cr as well as for luminance (hereinafter, briefly referred to as "luma") blocks, however, for convenience of descriptions, prediction for only luma blocks is described in the present invention. The luma prediction block P (310) is a 16×16 block consisting of several 4×4 blocks. In FIG. 3, small letters a through p are 4×4 blocks to be predicted and capital letters A, B, C, D and I, J, K, L are adjacent blocks to be used for predictions of the 4×4 blocks a through P.

Intra prediction is classified into 4×4 prediction and 16×16 prediction according to the size of a block to be predicted. 4×4 prediction has nine modes and 16×16 prediction has four modes, according to different directions of predictions. When the block P (310) is predicted, prediction samples are obtained in the nine 4×4 prediction modes according to the different directions of predictions, using pixel values of the blocks (A, B, C, D and I, J, K, L) adjacent to the 4×4 blocks to be predicted.

FIG. 4 is a table listing types of intra 4×4 luminance prediction modes.

Referring to FIG. 4, the 4×4 intra luma prediction modes include a vertical mode, a horizontal mode, a DC mode, a diagonal_down_left mode, a diagonal_down_right mode, a vertical_right mode, a horizontal_down mode, a vertical_left mode, and a horizontal_up mode. Directions in which predictions are performed in the respective prediction modes will be described with reference to FIG. 5. Predictions of blocks in the respective modes will be described with reference to FIGS. 6A through 6I.

FIG. 5 shows nine prediction directions for H.264 4×4 intra luminance prediction.

Referring to FIG. 5, a block is predicted in a vertical direction, a horizontal direction, a diagonal direction, etc., each corresponding to a mode type.

Figures 6A, 6B, 6C:
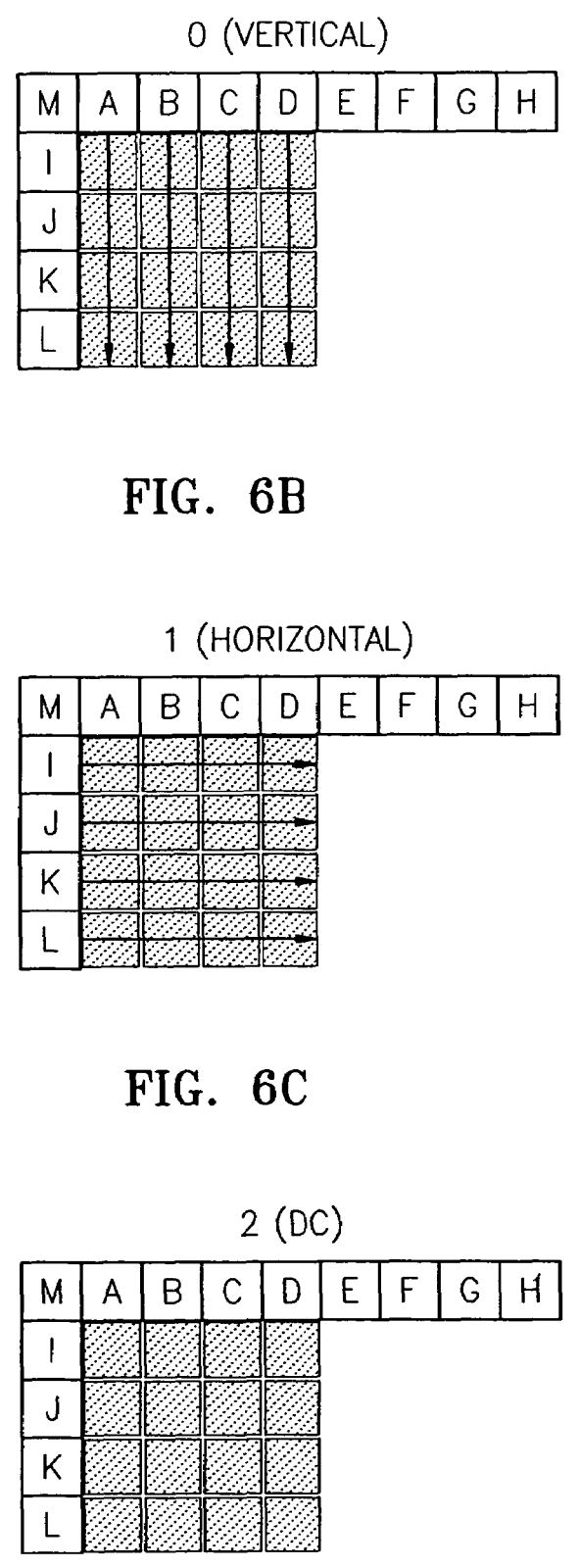

FIGS. 6A through 6I are views for describing predictions according to the 4×4 intra luminance prediction modes.

For example, in a mode 0 (vertical mode), 4×4 blocks a, e, i, and m are predicted using a pixel value of a block A; 4×4 blocks b, f, j, and n are predicted using a pixel value of a block B; 4×4 blocks c, g, k, and o are predicted using a pixel value of a block C; and 4×4 blocks d, h, l, and p are predicted using a pixel value of a block D. Predictions according to other modes are disclosed in detail in the H.264 standard.

When H.264 encoding is performed, an optimal mode among the 4×4 intra luma prediction modes is selected and prediction is performed in the optimal mode. Compression efficiency is different according to the mode in which luma prediction for a 4×4 block is performed. To select an optimal mode, a block is predicted in all modes, costs are calculated using a predetermined cost function, and a mode with a smallest cost is selected as the optimal mode. Accordingly, since a block to be predicted should be predicted in all of the nine modes and costs should be calculated respectively in the nine modes, an encoder becomes complicated.

SUMMARY OF THE INVENTION

The present invention provides an apparatus and method for determining a 4×4 intra luminance prediction mode, in which only a few modes, not all of nine modes are used to determine an optimal 4×4 intra luminance prediction mode.

According to an aspect of the present invention, there is provided a prediction mode determination method comprising: (a) grouping a plurality of predetermined prediction modes into a predetermined number of groups; (b) selecting one prediction mode for each of the groups, respectively, performing predictions for a predetermined block in the selected prediction modes, and calculating prediction errors in the selected prediction modes; and (c) performing predictions for the predetermined block in other prediction modes belonging to a group including a prediction mode with a smallest prediction error among the calculated prediction errors, calculating prediction errors in the other prediction modes, and deciding a prediction mode according to the calculated prediction errors.

According to another aspect of the present invention, there is provided a prediction mode determination method comprising: (a) performing predictions for a predetermined block in a vertical prediction mode corresponding to a vertical direction, a horizontal prediction mode corresponding to a horizontal direction, and a DC prediction mode corresponding to a current location, and calculating prediction errors in the respective modes; and (b) performing predictions for the predetermined block in prediction modes corresponding to prediction directions adjacent to a prediction direction of a prediction mode with a smallest prediction error among the calculated prediction errors, calculating prediction errors in the prediction modes, and selecting a prediction mode with a smallest prediction error among the calculated prediction errors.

According to still another aspect of the present invention, there is provided a prediction mode determination apparatus comprising: a prediction unit, which performs prediction for a predetermined block in a predetermined prediction mode, and outputs a prediction sample; a prediction error calculator which calculates a prediction error for the prediction sample; and a prediction error comparator, which compares prediction errors received from the prediction error calculator to each other, selects a prediction mode with a smallest prediction error according to the compared result, and outputs the selected prediction mode.

According to a further aspect of the present invention, there is provided a computer readable medium having embodied thereon a computer program for the prediction mode determination method of claim 1.

BRIEF DESCRIPTION OF THE DRAWINGS

The above and other features and advantages of the present invention will become more apparent by describing in detail exemplary embodiments thereof with reference to the attached drawings in which:

FIG. 3 shows a luminance block P to be predicted and its adjacent blocks to be used for prediction of the luminance block P;

FIG. 4 is a table listing types of intra 4×4 luminance prediction modes;

FIGS. 6A through 6I are views for describing predictions according to the 4×4 intra luminance prediction modes;

DETAILED DESCRIPTION OF THE ILLUSTRATIVE, NON-LIMITING EMBODIMENTS OF THE INVENTION

Hereinafter, embodiment of the present invention will be described in detail with reference to the appended drawings.

Figure 1:
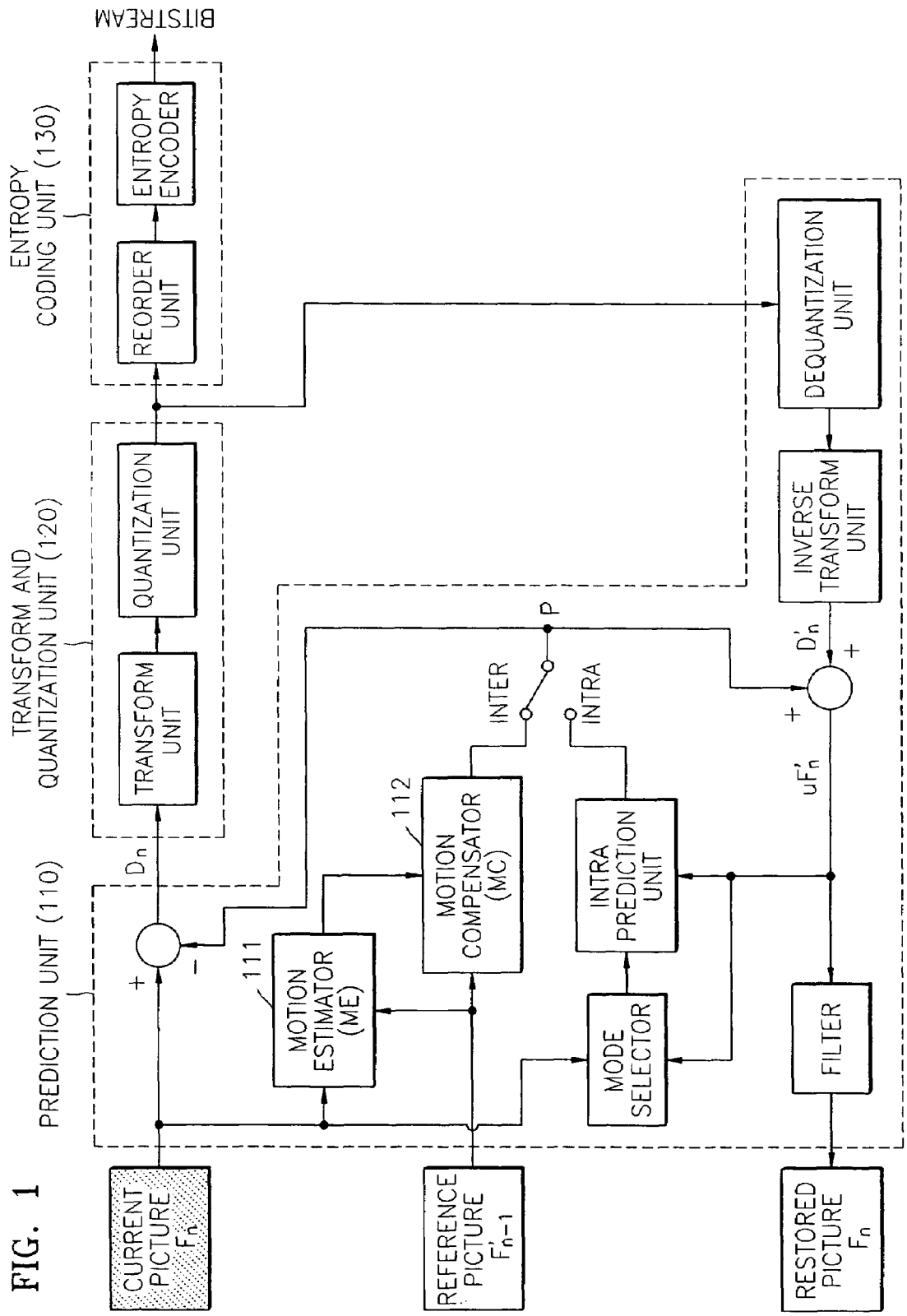
FIG. 1 is a block diagram of an H.264 encoder.
Figure 2:
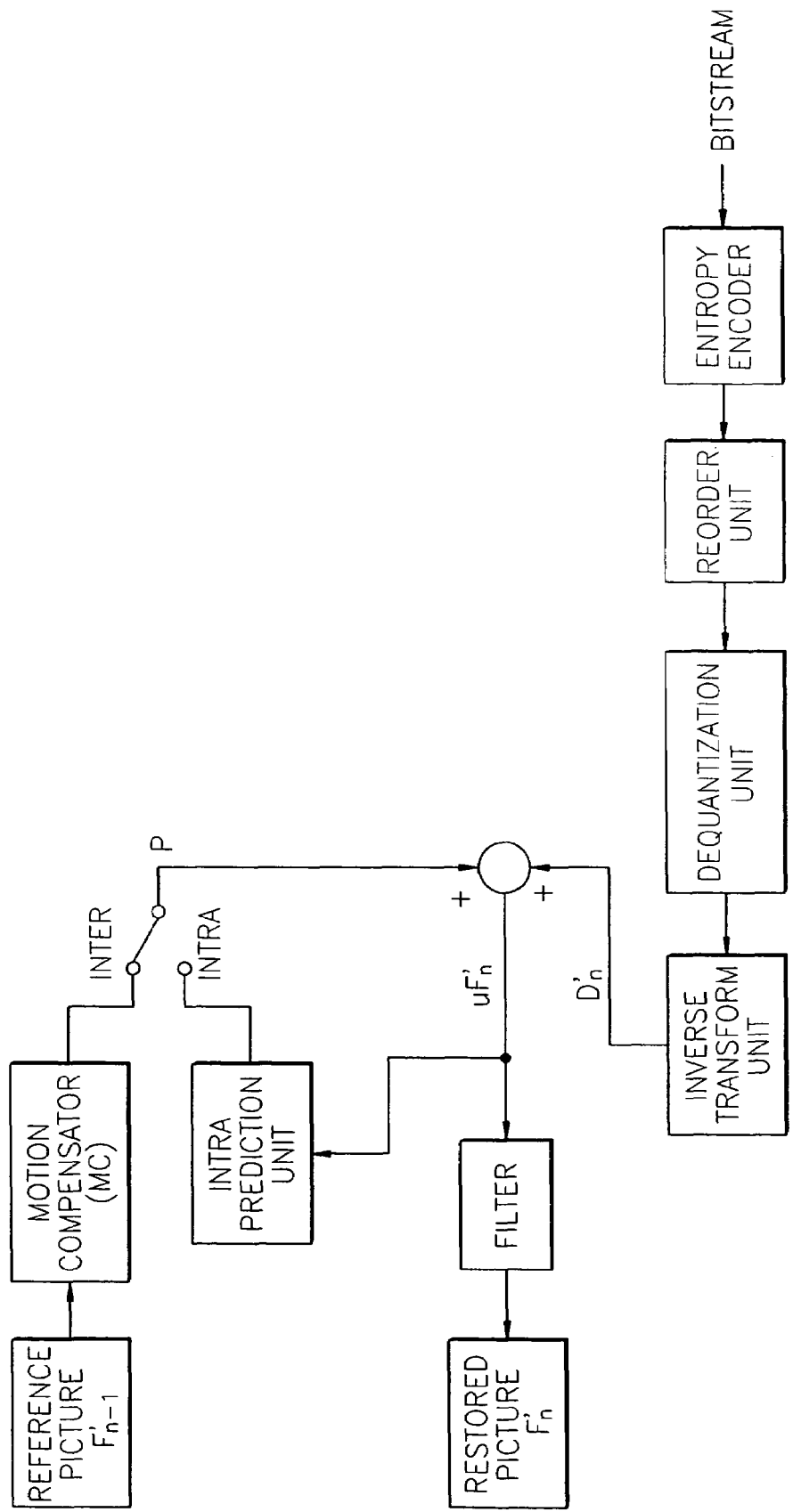
FIG. 2 is a block diagram of an H.264 decoder.
Figure 5:
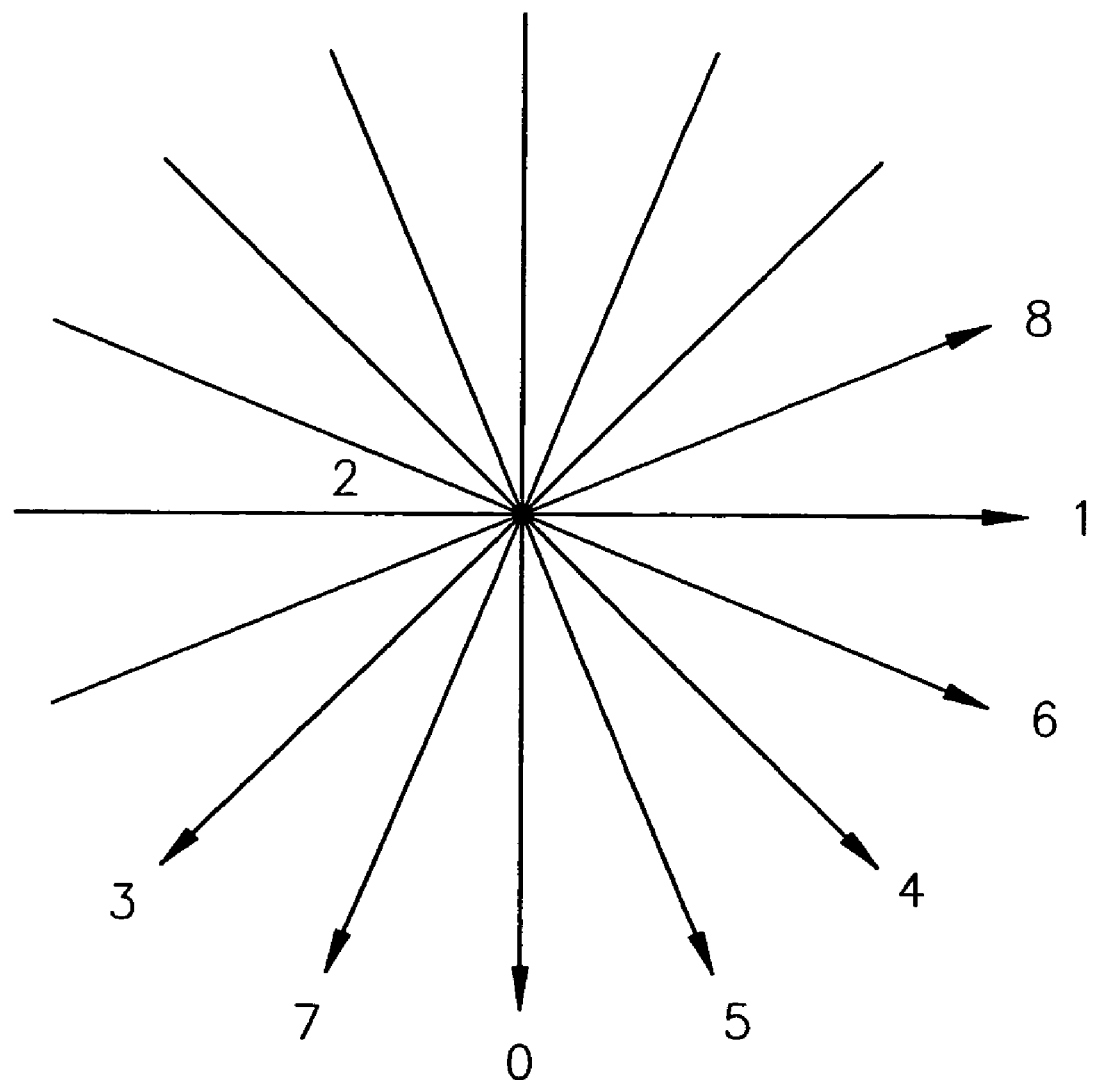
FIG. 5 shows nine prediction directions used for 4×4 intra luminance prediction according to H.264.
Figure 7A:
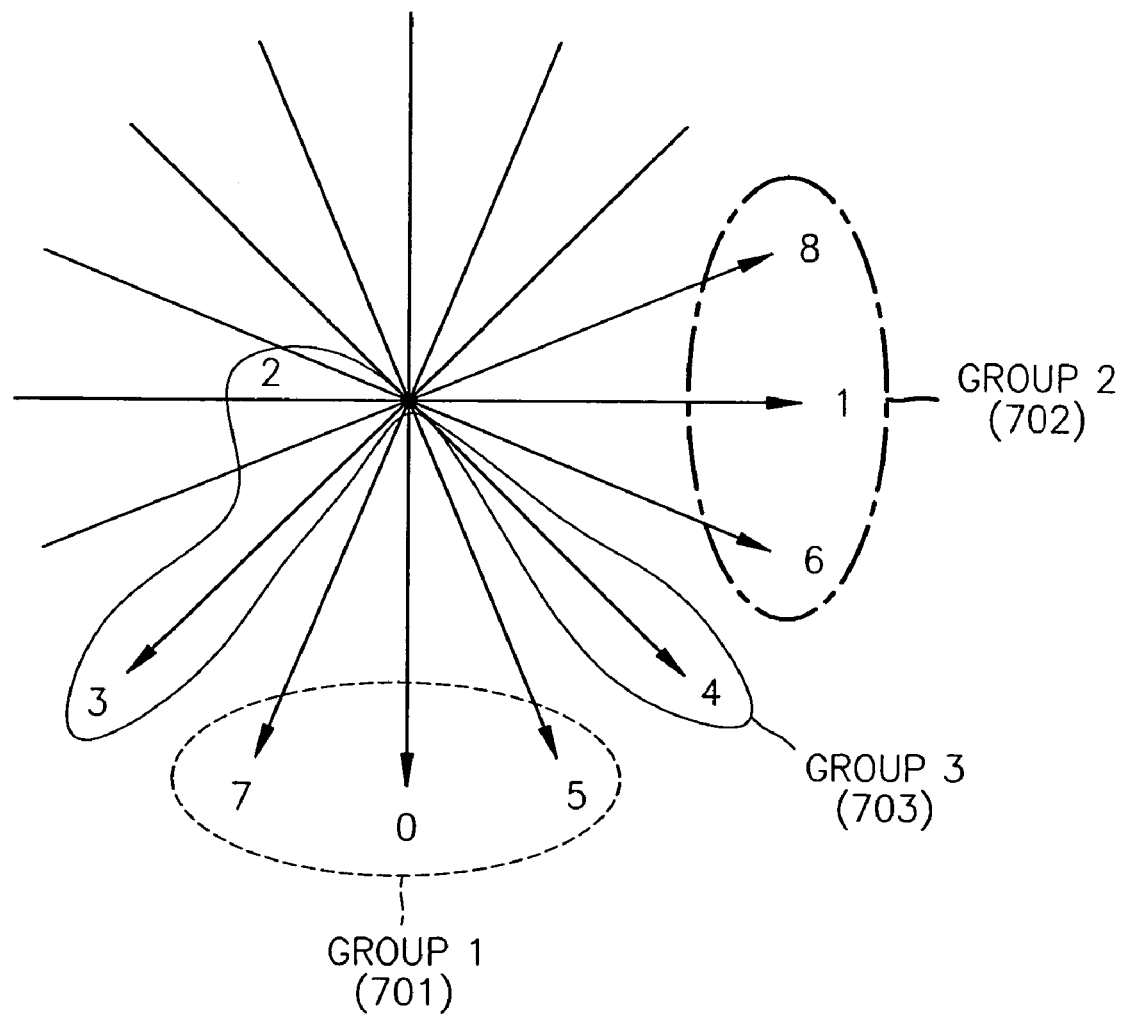
FIG. 7A is a view that partitions prediction directions corresponding to the 4×4 intra luminance prediction modes into three groups.

FIG. 7A is a view that partitions prediction directions corresponding to 4×4 intra luminance (hereinafter, referred to as "luma") prediction modes into three groups.

In the present invention, nine prediction modes for 4×4 intra luma prediction are grouped into groups of three and predictions are performed on each of the groups. In more detail, a mode 0 (vertical direction) and its adjacent modes 5 and 7 are grouped into a group 1 (701), a mode 1 (horizontal direction) and its adjacent modes 6 and 8 are grouped into a group 2 (702), and a mode 2 (DC) and the remaining modes 3 and 4 (diagonal direction) are grouped into a group 3 (703). Then, predictions are performed in representative modes 0, 1, and 2 of the respective groups, costs are calculated in the modes 0, 1, and 2, predictions are performed in other modes within a group including a mode selected according to calculated costs, and costs are calculated in the other modes.

Figure 7B:
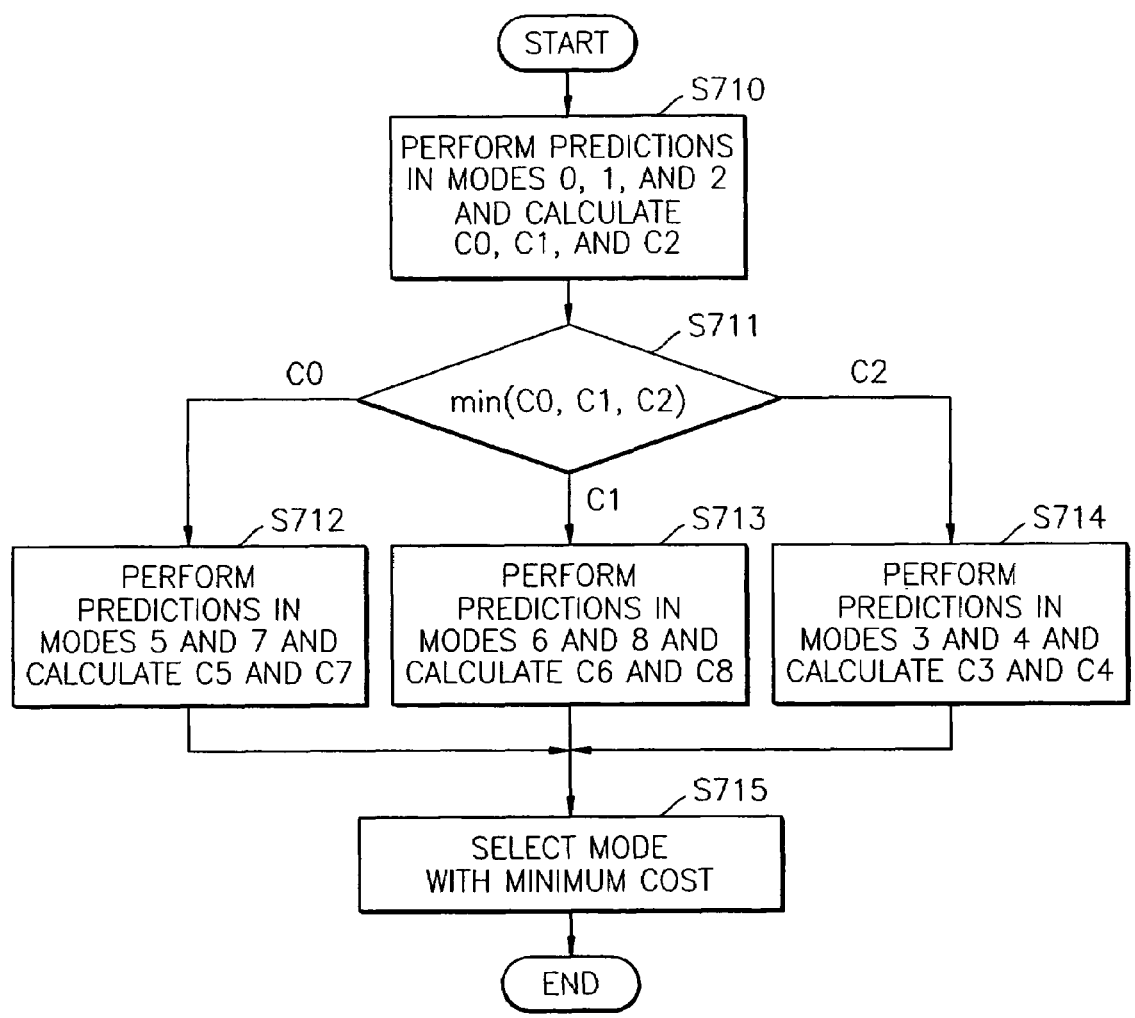
FIG. 7B is a flowchart illustrating a prediction mode determination method according to an embodiment of the present invention.

FIG. 7B is a flowchart illustrating a prediction mode determination method according to an embodiment of the present invention.

First, predictions for a predetermined block are performed in the modes 0, 1, and 2 and costs C0, C1, and C2 are calculated in the respective modes (step S710). The cost is a residue obtained by subtracting an original pixel value of a prediction target sample (predetermined block) from a predicted pixel value of the prediction target sample. The costs are calculated by applying an SSD function, an SAT function, or an SATD function (they will be described later) for the prediction target sample. A method for calculating the costs will be described later. Then, it is determined which cost among the costs C0, C1, and C2 is smallest (step 711). According to the determined result, predictions for the predetermined block are performed in the modes 5 and 7 adjacent to the mode 0 and costs C5 and C7 are calculated (step S712), predictions for the predetermined block are performed in the modes 6 and 8 adjacent to the mode 1 and costs C6 and C8 are calculated (step S713), or predictions for the predetermined block are performed in the modes 3 and 4 adjacent to the mode 2 and costs C3 and C4 are calculated (step S714). Then, the cost values calculated in steps S712, S713, or S714 are compared to one another and a mode with a smallest cost is selected (step S715). That is, min(C0, C5, C7), min(C1, C6, C8), or min(C2, C3, C4) is calculated, so that a mode with a smallest cost is selected.

Figure 8:
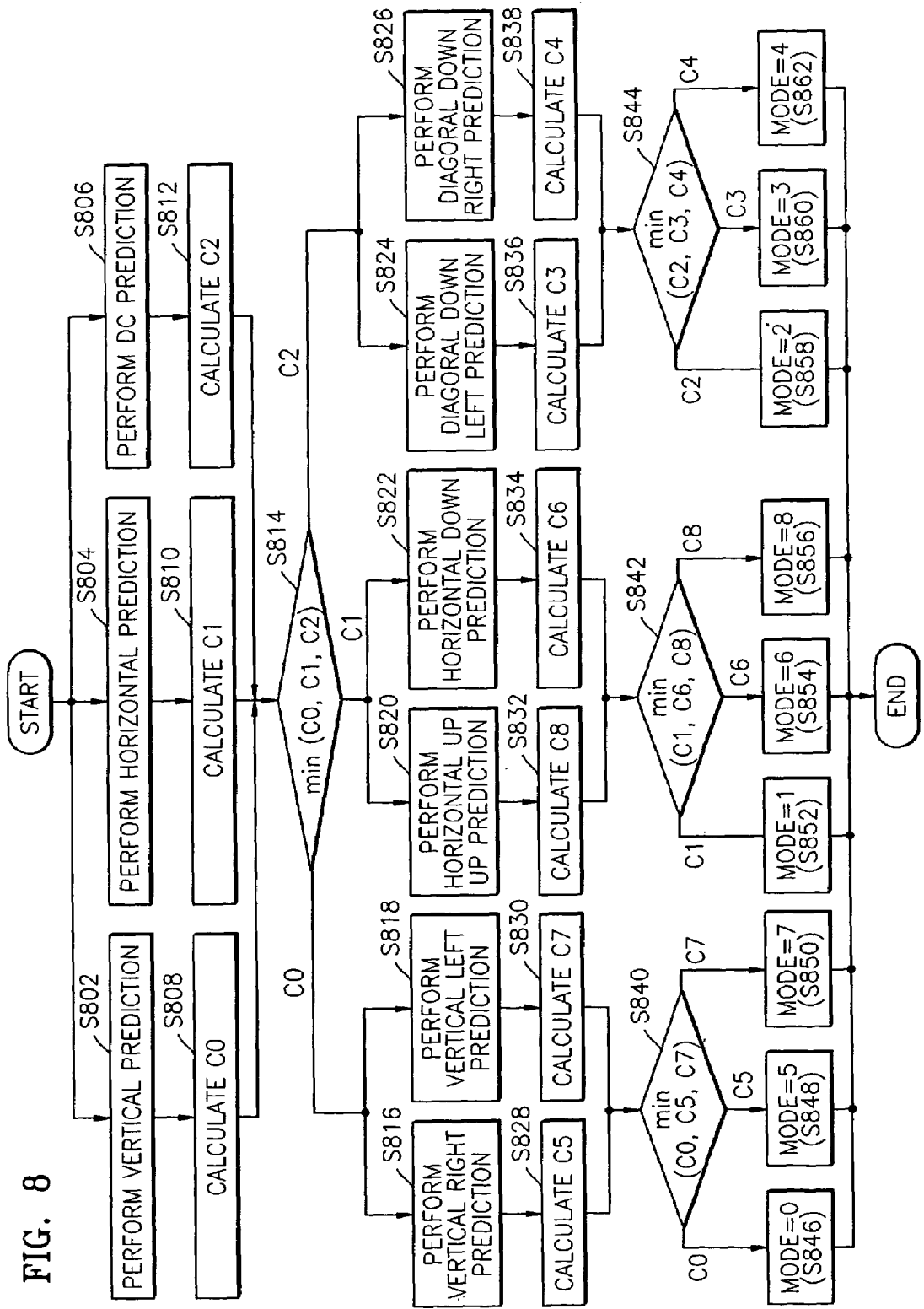
FIG. 8 is a detailed flowchart illustrating the prediction mode determination method according to the embodiment of the present invention.

FIG. 8 is a detailed flowchart illustrating the prediction mode determination method according to the embodiment of the present invention.

Predictions for a 4×4 block are performed in mode 0 (vertical mode), mode 1 (horizontal mode), and mode 2 (DC mode) (steps S802, S804, and S806). Accordingly, prediction samples for the 4×4 block are obtained. Then, prediction costs C0, C1, and C2 for the prediction samples are calculated using a cost function (steps S808, S810, S812). The prediction costs C0, C1, and C2 are residual values (that is, prediction errors) obtained by subtracting original pixel values of the prediction samples from predicted pixel value of the prediction samples.

Methods for calculating the costs are various. The cost function includes an SAD (sum of absolute value) function, an SATD (sum of absolute transformed difference) function, an SSD (sum of squared difference) function, a MAD (mean of absolute difference) function, a Lagrange function, and the like. The SAD function sums the absolute values of the prediction errors (residues) for a 4×4 block. The SATD function sums the absolute values of coefficients obtained by applying a Hadamard Transform to the prediction errors for a 4×4 block. The SSD function sums the square values of the prediction errors for a 4×4 block prediction sample. The MAD function calculates the average value of the absolute values of the prediction errors for a 4×4 block prediction sample. The Lagrange function is a new cost function of adding bit-stream length information to one of the above-mentioned cost functions.

Then, it is determined which cost value among the cost values C0, C1, and C2 calculated in modes 0, 1, and 2 is smallest (step S814). Predictions are performed in different modes according to the determined result. In more detail, if the cost value C0 of the mode 0 is smallest, predictions are performed in modes 5 and 7 adjacent to the mode 0 (steps S816 and S818). If the cost value C1 of the mode 1 is smallest, predictions are performed in the modes 8 and 6 adjacent to the mode 1 (steps S820 and step S822). If the cost value C2 of the mode 2 is smallest, predictions are performed in the modes 3 and 4 adjacent to the mode 2 (steps S824 and S826).

Then, the cost values C5 and C7 of the modes 5 and 7 are calculated respectively (steps S828 and S830), the cost values C8 and C6 of the modes 8 and 6 are calculated respectively (steps S832 and S834), or the cost values C3 and C4 of the modes 3 and 4 are calculated respectively (steps S836 and S838).

If it is determined that the cost value C0 is smallest in step S814 and accordingly steps S816, S818, S828, and S830 are performed, a smallest cost value among the calculated cost values C0, C5, and C7 is searched for (step S840) and a mode corresponding to the smallest cost value is selected. Likewise, if it is determined that the cost value C1 is smallest in step S814 and accordingly steps S820, S822, S832, and S834 are performed, a smallest cost value among the calculated cost values C1, C6, and C8 is searched for (step S842) and a mode corresponding to the smallest cost value is selected. Also, if it is determined that the cost value C2 is smallest in step S814 and accordingly steps S824, S826, S836, and S838 are performed, the smallest cost value among the calculated values C2, C3, and C4 is searched for (step S844) and a mode corresponding to the smallest cost value is selected.

Therefore, one among the modes 0, 5, and 7 is selected (steps S846, S848, S850), one among the modes 1, 6, and 8 is selected (steps S852, S854, S856), or one among the modes 2, 3, and 4 is selected (steps S858, S860, S862).

As described above, an optimal prediction mode can be selected by performing predictions in only five prediction modes, instead of performing predictions in all prediction modes. That is, by partitioning a plurality of prediction modes into several groups and performing predictions on each of the groups, an optimal mode with a smallest prediction error can be selected using lower calculation times.

Figure 9A:
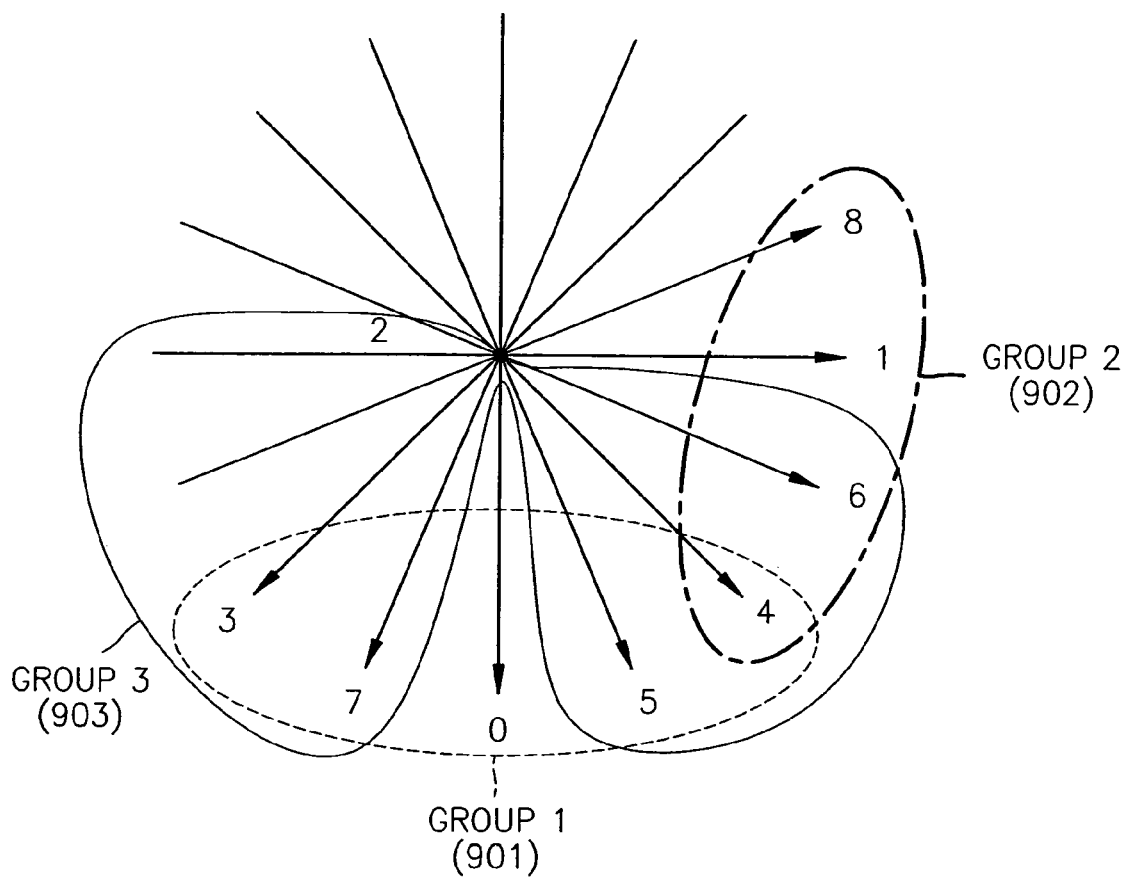
FIG. 9A is a view that partitions prediction directions corresponding to prediction modes into three groups, according to another embodiment of the present invention.

FIG. 9A is a view that partitions prediction modes into three groups, according to another embodiment of the present invention.

To improve prediction performance, according to another embodiment of the present invention, each of the groups further includes additional adjacent modes. In more detail, the modes 0, 7, and 5 and their adjacent modes 3 and 4 are grouped into a group 1 (901); the modes 1, 8, and 6 and their adjacent mode 4 are grouped into a group 2 (902); and the modes 2, 3, and 4 and their adjacent modes 7, 5, and 6 are grouped into a group 3 (903). Then, predictions are performed for each of the newly created groups.

Figure 9B:
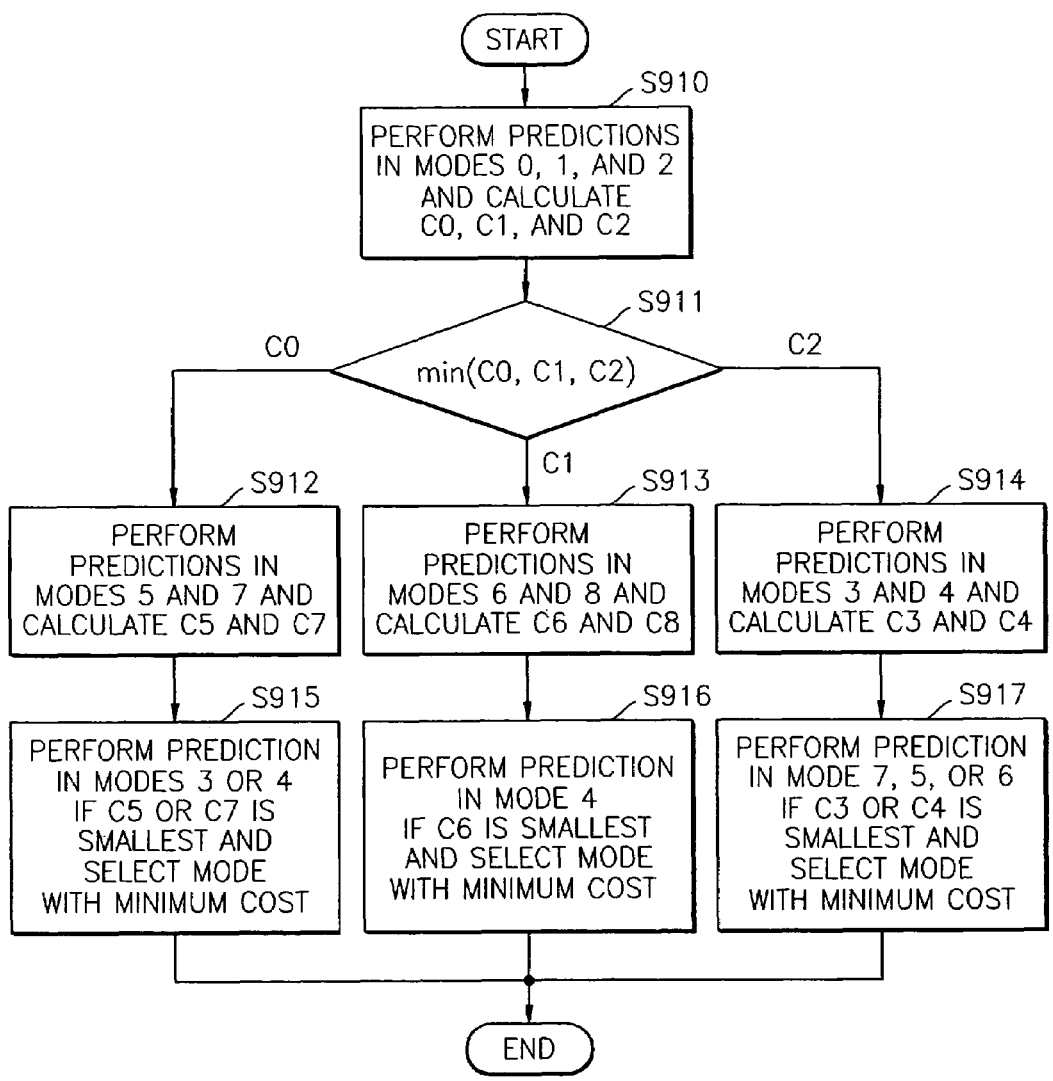
FIG. 9B is a flowchart illustrating a prediction mode determination method according to another embodiment of the present invention.

FIG. 9B is a flowchart illustrating a prediction mode determination method according to another embodiment of the present invention.

First, predictions are performed in modes 0, 1, and 2 and costs C0, C1, and C2 in the respective modes are calculated (step S910), as described above. Then, it is determined which cost among the costs C0, C1, and C2 is smallest (step S911).

If it is determined that the cost C0 is smallest in step S911 and costs C5 and C7 in the modes 5 and 7 are calculated in step S912, mode selection is again conducted according to which cost among the costs C0, C5, and C7 is smallest (step S915). If the cost C5 is smallest, prediction is performed in the mode 4 adjacent to the mode 5, a cost C4 is calculated, and a mode with the smaller cost value among the costs C5 and C4 is selected as an optimal mode. If the cost C7 is smallest, prediction is performed in the mode 3 adjacent to the mode 7, a cost C3 is calculated, and a mode with the smaller cost value among the costs C7 and C3 is selected as an optimal mode. Through such process, an optimal mode with a smallest cost is selected.

Likewise, if it is determined that the cost C1 is smallest in step S911 and accordingly costs C6 and C8 in the modes 6 and 8 are calculated in step S913, mode selection is again conducted according to which cost among the costs C1, C6, and C8 is smallest. If the cost C6 is smallest, prediction is performed in the mode 4 adjacent to the mode 6, a cost C4 is calculated, and a mode with the smaller cost value among the costs C4 and C6 is selected as an optimal mode.

Also, if it is determined that the cost C2 is smallest in step S911 and accordingly costs C3 and C4 in the modes 3 and 4 are calculated, mode selection is again conducted according to which cost among the costs C2, C3, and C4 is smallest (step S917). For example, if the cost C3 is smallest, prediction is performed in the mode 7 adjacent to the mode 3, a cost C7 is calculated, and a mode with the smaller cost among the costs C3 and C7 is selected as optimal mode. If the cost C4 is smallest, predictions are performed in the modes 5 and 6 adjacent to the mode 4, costs C5 and C6 are calculated, and a mode with the smallest cost among the costs C4, C5, and C6 is selected as an optimal mode.

Figure 10A:
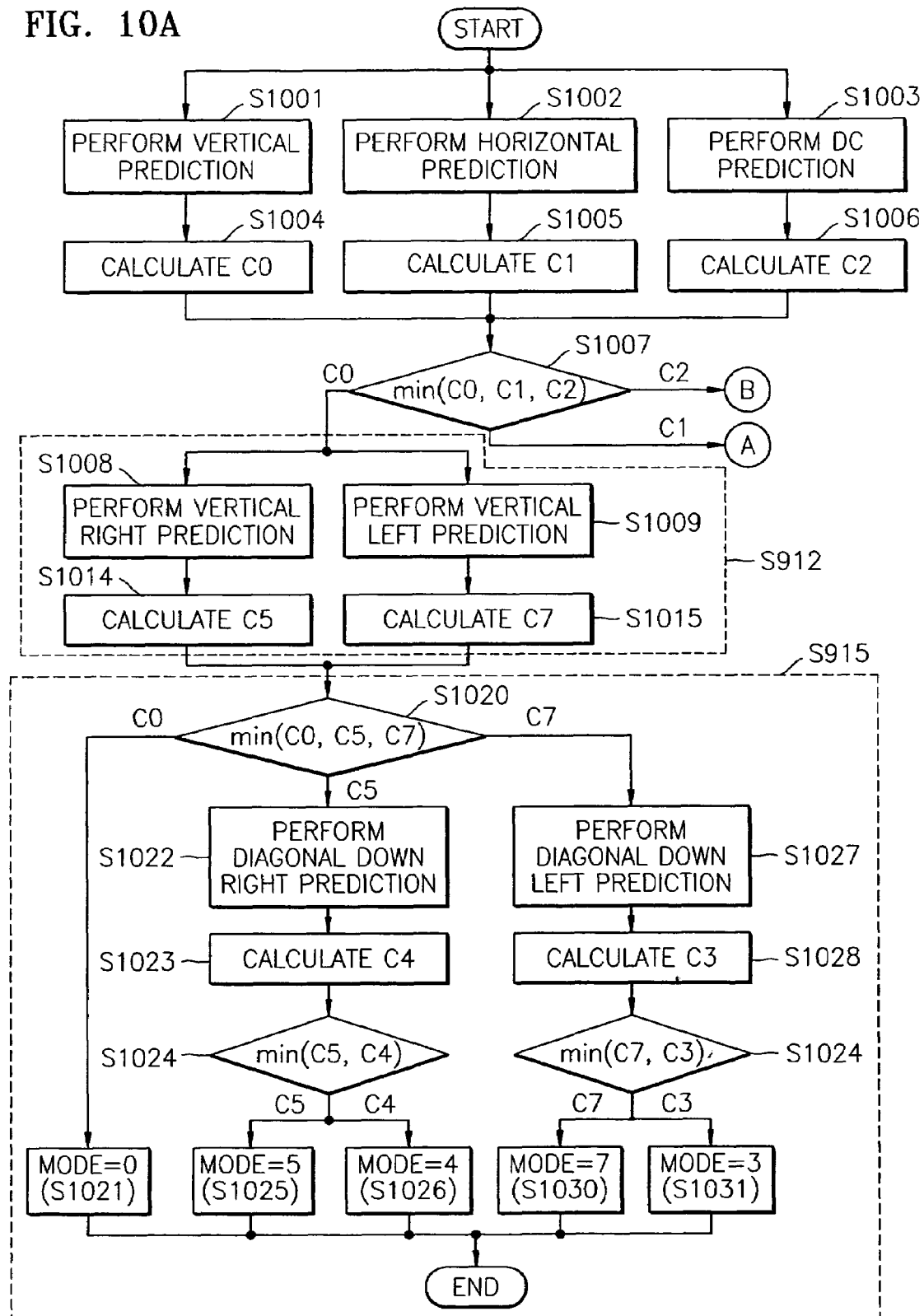
FIGS. 10A and 10B are a detailed flowchart illustrating the prediction mode determination method according to other embodiments of the present invention.
Figure 10B:
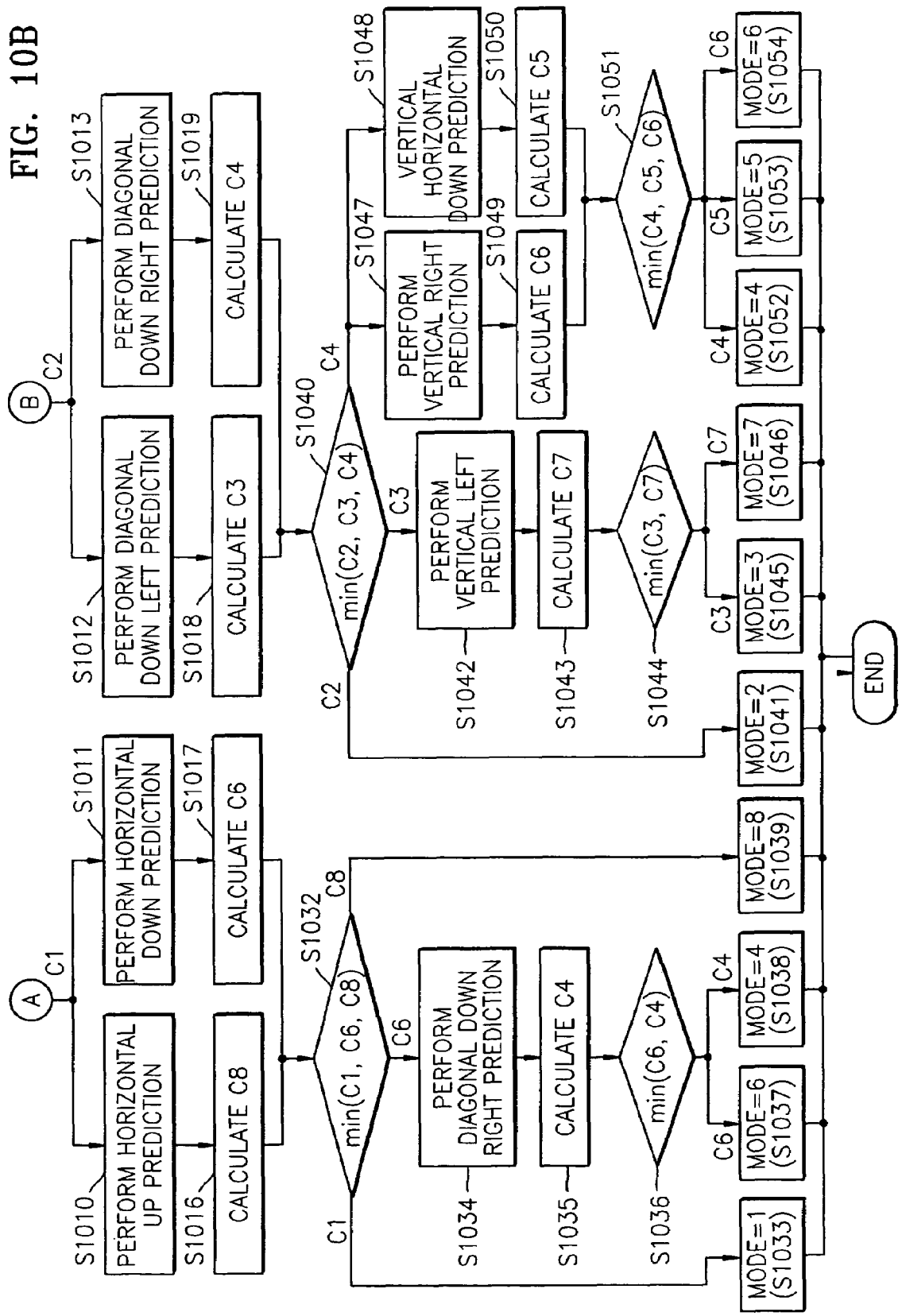

FIGS. 10A and 10B are a detailed flowchart illustrating the prediction mode determination method according to another embodiment of the present invention.

Predictions for a 4×4 block are performed in the mode 0 (vertical mode), the mode 1 (horizontal mode), and the mode 2 (DC mode) (steps S1001, S1002, and S1003), thereby obtaining prediction samples. Then, costs C0, C1, and C2 for the prediction samples are calculated using a cost function (steps S1004, S1005, and S1006). The cost function may be one among the cost functions described above with reference to FIG. 8.

Then, a mode with a smallest cost value among the calculated cost values C0, C1, and C2 is selected (step S1007). If the cost value C0 of the mode 0 is smallest, predictions are performed in the modes 5 and 7 adjacent to the mode 0 (steps S1008 and S1009). If the cost value C1 of the mode 1 is smallest, predictions are performed in the modes 8 and 6 adjacent to the mode 1 (steps S1010 and S1011). Also, if the cost value C2 of the mode 2 is smallest, prediction is performed in the mode 3 adjacent to the mode 2 (step S1013).

Then, the cost values C5 and C7 in the modes 5 and 7 are calculated respectively (steps S1014 and S1015), the cost values C8 and C6 in the modes 6 and 8 are calculated respectively (steps S1016 and S1017), or the cost values C3 and C4 in the modes 3 and 4 are calculated respectively (steps S1018 and S1019). The above steps are the same as those described above with reference to FIG. 8.

If steps S1014 and S1015 are performed, a smallest cost value among the costs C0, C5, and C7 is searched for (step S1020). If the cost C0 is smallest, the mode 0 is selected (step S1021). If the cost C5 is smallest, prediction is performed in the mode 4 adjacent to the mode 5 (step S1022). Then, a cost C4 is calculated (step S1023) and the cost C4 is compared with the cost C5 (step 1024). If the cost C5 is smaller than the cost C4, the mode 5 is selected (step S1025). If the cost C4 is smaller than the cost C5, the mode 4 is selected (step S1026). If the cost C7 is smallest in step S1020, prediction is performed in the mode 3 adjacent to the mode 7 (step S1027). Then, a cost C3 is calculated (step S1028) and the cost C3 is compared with the cost C7 (step S1029). Then, if the cost C3 is smaller than the cost C7, the mode 3 is selected (step S1031). If the cost C7 is smaller than the cost C3, the mode 7 is selected (step S1030).

If steps S1016 and S1017 are performed, a smallest cost value among the costs C1, C6, and C8 is searched for (step S1032). If the cost C1 is smallest, the mode 1 is selected (step S1033). If the cost, C6 is smallest, prediction is performed in the mode 4 adjacent to the mode 6 (step S1034) and a cost C4 is calculated (step S1035). Then, the cost C4 is compared with the cost C6 (step S1036). If the cost C4 is smaller than the cost C6, the mode 4 is selected (step S1038). If the cost C6 is smaller than the cost C4, the mode 6 is selected (step S1037). If the cost C8 is smallest in step S1032, the mode 8 is selected (step S1039).

If steps S1018 and S1019 are performed, a smallest cost value among the costs C2, C3, and C4 is searched for (step S1040). If the cost C2 is smallest, the mode 2 is selected (step S1041). If the cost C3 is smallest, prediction is performed in the mode 7 adjacent to the mode 3 (step S 1042) and a cost C7 is calculated (step S1043). Then, the cost C3 is compared with the cost C7 (step 1044). If the cost C3 is smaller than the cost C7, the mode 3 is selected (step S1045). If the cost C7 is smaller than the cost C3, the mode 7 is selected (step S1046). If the cost C4 is smallest, predictions are performed in the modes 5 and 6 adjacent to the mode 4 (steps S1047 and S1048). Then, costs C6 and C5 are calculated (steps S1049 and S1050) and it is determined whether which cost among the costs C4, C5, and C6 is smallest (step S1051). If the cost C4 is smallest, the mode 4 is selected (step S1052). If the cost C5 is smallest, the mode 5 is selected (step S1053). If the cost C6 is smallest, the mode 6 is selected (step S1054).

That is, prediction modes are partitioned into several groups and an optimal mode is selected for each of the groups. Assuming that selection probabilities are the same in all prediction modes, 5.8 prediction counts are taken on the average until an optimal mode is selected. However, considering that the selection probabilities of the modes 0, 1, and 2 are higher, average prediction counts will be smaller than 5.8.

Figure 11:
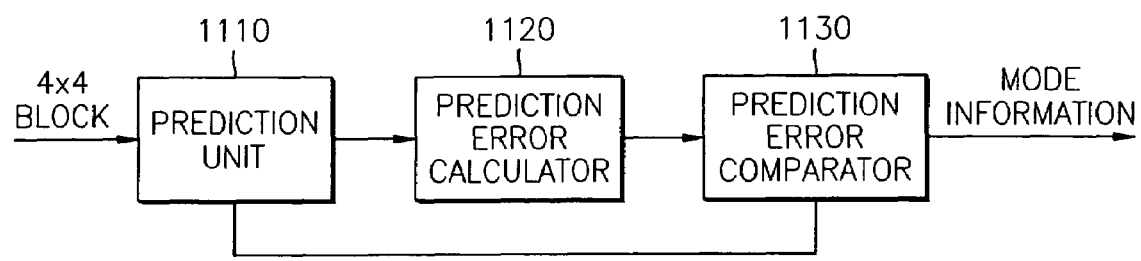
FIG. 11 is a block diagram of a prediction mode determination apparatus according to an embodiment of the present invention.

FIG. 11 is a block diagram of a prediction mode determination apparatus according to an embodiment of the present invention.

The prediction mode determination apparatus includes a prediction unit 1110, a prediction error calculator 1120, and a prediction error comparator 1130.

The prediction unit 1110 priority-performs prediction for a 4×4 block in a mode with a highest probability to be selected. According to an embodiment of the present invention, the prediction unit 1110 can priority-perform prediction for a 4×4 block in the mode 0 (vertical mode), the mode 1 (horizontal mode), and the mode 2 (DC mode). Also, the prediction unit 1110 can perform prediction for the 4×4 block in a mode selected according to mode information received from the prediction error comparator 1130.

The prediction error calculator 1120 calculates and outputs prediction errors (that is, costs) for prediction samples output from the prediction unit 1110. The prediction error is a residue value obtained by subtracting a predicted value of a prediction target (for example, 4×4 block) from an original pixel value of the prediction target. A cost function used when calculating the prediction error may be one among the cost functions described above with reference to FIG. 8.

The prediction error comparator 1130 compares the cost values received from the prediction error calculator 1120, and selects and outputs a mode with a minimum cost value among the cost values.

If mode information with the minimum cost value is transferred to the prediction unit 1110, the prediction unit 1110 performs secondary prediction according to the received mode information. Secondary prediction is performed in the modes 5 and 7, in the modes 8 and 6, or in the modes 3 and 4, as described above with reference to FIG. 8, FIG. 10A, and FIG. 10B. Then, costs in the corresponding modes are calculated by the prediction error calculator 1120 and are compared by the prediction error comparator 1130. According to the compared result, a mode is selected. Next, the selected mode information is output as final mode information, or again transferred to the prediction unit 1110 when tertiary prediction is required. The prediction unit 1110 performs tertiary prediction according to the received mode information. Tertiary prediction has been described above with reference to FIG. 10A and FIG. 10B.

In an encoder, prediction error samples are obtained in the prediction modes selected according to the above-described method, and transform and quantization for the prediction error samples are performed. Likewise, in a decoder, intra predictions are performed in the selected prediction modes.

As described above, according to the prediction mode determination method of the present invention, it is possible to select an optimal prediction mode through the lower calculation times, thereby preventing an encoder from being complicated.

In other words, since a plurality of modes are partitioned into a predetermined number of groups, prediction errors are calculated and compared for each of groups, and an optimal mode is selected, it is possible to reduce the number of used modes. Also, since predictions for a block are first performed in modes with priority (modes 0, 1, and 2), it is possible to prevent an encoder from being complicated.

The present invention may be embodied as a program on a computer readable medium including, but not limited to storage media, such as magnetic storage media (e.g., ROM's, floppy disks, hard disks, etc.), and optically readable media (e.g., CD-ROMs, DVDs, etc.). The program may be executed independently or may be executed in a distributed manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A prediction mode determination method comprising:
   (a) grouping a plurality of prediction modes into a first number of groups;
   (b) selecting one prediction mode for each of the first number of groups, respectively performing predictions for a block in the selected prediction modes, and calculating prediction errors for the predictions performed in each of the selected prediction modes; and
   (c) performing predictions for the block in other prediction modes belonging to a specific group among the first number of groups which includes a prediction mode among the selected prediction modes with a smallest prediction error among the calculated prediction errors, calculating prediction errors for the predictions performed in each of the other prediction modes, and deciding a prediction mode for the block according to the calculated prediction errors in the other prediction modes.

2. The method of claim 1, wherein in step (a), the plurality of prediction modes are partitioned into the first number of groups according to different directions of predictions.

3. The method of claim 1, wherein in step (a), according to different directions of predictions, a first prediction mode corresponding to a vertical direction and adjacent prediction modes corresponding to directions adjacent to the vertical direction are grouped into a first group, a second prediction mode corresponding to a horizontal direction and adjacent prediction modes corresponding to directions adjacent to the horizontal direction are grouped into a second group, and remaining prediction modes corresponding to remaining directions are grouped into a third group.

4. The method of claim 1, wherein in step (b), the selected prediction modes are a prediction mode corresponding to a vertical direction, a prediction mode corresponding to a horizontal direction, and a DC prediction mode corresponding to a current location.

5. The method of claim 1, wherein step (c) comprises:
   (c1) performing predictions for the block in the other prediction modes belonging to the specific group which includes the prediction mode with the smallest prediction error and calculating prediction errors for the predictions performed in each of the other prediction modes; and
   (c2) comparing the calculated prediction errors of the other prediction modes to each other and outputting a prediction mode among the calculated prediction errors of the other prediction modes with a smallest prediction error according to a result of comparing the calculated prediction errors of the other prediction modes to each other.

6. The method of claim 5, after step (c2), further comprising:
   (c3) performing prediction for the block in a prediction mode corresponding to a prediction direction adjacent to a prediction direction of the prediction mode output in step(c2), and calculating a prediction error for the prediction performed in the prediction mode corresponding to the prediction direction adjacent to a prediction direction of the prediction mode output in step (c2); and
   (c4) comparing the calculated prediction error of the prediction mode corresponding to the prediction direction adjacent to the prediction direction of the prediction mode output in step (c2) with the prediction error of the prediction mode output in step (c2) and outputting a prediction mode with a smallest prediction error according to a result of comparing the calculated prediction error of the prediction mode corresponding to the prediction direction adjacent to the prediction direction of the prediction mode output in step (c2) with the prediction error of the prediction mode output in step (c2).

7. The method of claim 1, wherein the block is a luminance block.

8. The method of claim 1, wherein the prediction error is a residue value obtained by subtracting an original pixel value of the block from a predicted pixel value of the block, and is calculated using a predetermined cost function.

9. A prediction mode determination method comprising:
   (a) performing predictions for a block in a vertical prediction mode corresponding to a vertical direction, a horizontal prediction mode corresponding to a horizontal direction, and a DC prediction mode corresponding to a current location, and calculating prediction errors for the predictions performed in each of the respective modes; and
   (b) performing predictions for the block in prediction modes corresponding to prediction directions adjacent to a prediction direction of a first prediction mode, among the vertical prediction mode, the horizontal prediction mode, and the DC prediction mode, with a smallest prediction error among the calculated prediction errors for the predictions performed in the respective modes, calculating prediction errors for the predictions performed in each of the prediction modes corresponding to prediction directions adjacent to the prediction direction of the first prediction mode, and selecting a prediction mode among the prediction modes corresponding to prediction directions adjacent to the prediction direction of the first prediction mode and the first prediction mode with the smallest prediction error among the calculated prediction errors in the prediction modes corresponding to prediction directions adjacent to the prediction direction of the prediction mode and the prediction error of the first prediction mode.

10. The method of claim 9, after step (b), further comprising:
   (c) performing predictions for the block in prediction modes corresponding to prediction directions adjacent to a prediction direction of the selected prediction mode, calculating prediction errors for the predictions performed in each of the prediction modes corresponding to prediction directions adjacent to the prediction direction of the selected prediction mode, and selecting a prediction mode with a smallest prediction error among the calculated prediction errors of the prediction modes corresponding to prediction directions adjacent to the prediction direction of the selected prediction mode and the prediction error of the selected prediction mode.

11. The method of claim 9, wherein each of the vertical prediction mode, the horizontal prediction mode, and the DC prediction mode is a 4×4 intra luminance prediction mode.

12. A prediction mode determination apparatus comprising:
   a prediction unit which performs prediction for a block in different prediction modes, and outputs a prediction sample for each of the different prediction modes;
   a prediction error calculator which calculates a prediction error for each of the prediction samples corresponding to the different prediction modes; and
   a prediction error comparator, which compares the prediction errors corresponding to the different prediction modes received from the prediction error calculator, selects a prediction mode among the different prediction modes with a smallest prediction error according to a result of the compared prediction errors, and outputs the selected prediction mode.

13. The apparatus of claim 12, wherein the prediction unit selects one prediction mode among the different prediction modes for each of a plurality of groups partitioned according to different directions of predictions.

14. The apparatus of claim 12, wherein the prediction unit priority-performs predictions for the block in a vertical prediction mode corresponding to a vertical direction, a horizontal prediction mode corresponding to a horizontal direction, and a DC prediction mode corresponding to a current location.

15. The apparatus of claim 12, wherein the prediction error calculator calculates the prediction error by subtracting an original pixel value of the block from a pixel value of the prediction sample, using a predetermined cost function.

16. The apparatus of claim 12, wherein the prediction unit receives the smallest prediction error and the corresponding prediction mode from the prediction error comparator, and performs secondary prediction for the block in prediction modes corresponding to prediction directions adjacent to a prediction direction of the received prediction mode.

17. The apparatus of claim 12, wherein the block is a luminance block.

18. A computer readable medium having embodied thereon a computer program for implementing functions of a prediction mode determination method on a computer, said functions comprising:

(a) partitioning a plurality of prediction modes into a first number of groups;
(b) selecting one prediction mode for each of the first number of groups, respectively performing predictions for a block in the selected prediction modes, and calculating prediction errors for the predictions performed in each of the selected prediction modes; and
(c) performing predictions for the block in other prediction modes belonging to a specific group among the first number of groups which includes a prediction mode among the selected prediction modes with a smallest prediction error among the calculated prediction errors, calculating prediction errors for the predictions performed in each of the other prediction modes, and deciding a prediction mode for the block according to the calculated prediction errors in the other prediction modes.

19. The method of claim 1, wherein the plurality of the prediction modes comprises at least three different prediction modes, and the first number of groups comprises at least three groups respectively corresponding to each of the at least three different prediction modes, wherein step (b) comprises always performing at least three predictions for the block in the at least three different prediction modes.

20. The method of claim 9, wherein step (a) comprises unconditionally performing predictions for the block in the vertical prediction mode, the horizontal prediction mode, and the DC prediction mode prior to calculating the prediction errors for the predictions performed in each of the respective modes.

21. The method of claim 10, wherein step (c) is only performed if the first prediction mode is not selected in step (b).

22. The apparatus of claim 12, wherein the different prediction modes comprise at least three prediction modes, and the prediction unit always performs the prediction for the block in each of the at least three different prediction modes.

23. The computer readable medium of claim 18, wherein the plurality of the prediction modes comprises at least three different prediction modes, and the first number of groups comprises at least three groups respectively corresponding to each of the at least three different prediction modes, wherein step (b) comprises unconditionally performing at least three predictions for the block in the at least three different prediction modes.

* * * * *